United States Patent [19]

Powers

[11] 4,300,822
[45] Nov. 17, 1981

[54] MULTIPURPOSE FILM CASSETTE HAVING BALANCED FORCE PROCESS MODE SWITCH

[75] Inventor: Sheldon D. Powers, Stoneham, Mass.

[73] Assignee: Polaroid Corporation, Cambridge, Mass.

[21] Appl. No.: 63,673

[22] Filed: Aug. 6, 1979

[51] Int. Cl.³ .............................................. G03C 11/00
[52] U.S. Cl. ..................................... 352/130; 352/72; 352/78 R
[58] Field of Search ..................... 352/72, 78 R, 78 C, 352/130

[56] References Cited

U.S. PATENT DOCUMENTS

| | | | |
|---|---|---|---|
| 3,778,140 | 12/1973 | Land | 352/130 |
| 3,785,725 | 1/1974 | Batter et al. | 352/130 |
| 4,003,064 | 1/1977 | Mason | 352/130 |

Primary Examiner—Monroe H. Hayes
Attorney, Agent, or Firm—Frederick A. Goettel, Jr.

[57] ABSTRACT

A multipurpose film handling cassette of the type in which a photographic film strip is exposed, processed and projected without removal of the film from the cassette is provided with a two-piece "balanced force" arrangement for signaling to the apparatus with which it is to be used the unprocessed or processed condition of the film within the cassette. By "balanced force" it is meant that the indicating elements do not rely on any inherent deformation or internal resiliency to move the elements from an unprocessed mode to the processed mode. Further, no external force is required to act upon the terminals to hold them in a desired position.

5 Claims, 5 Drawing Figures

MULTIPURPOSE FILM CASSETTE HAVING BALANCED FORCE PROCESS MODE SWITCH

BACKGROUND OF THE INVENTION

This invention relates to multipurpose film cassettes of the type in which a photographic film strip is exposed, processed and projected without removal from the cassette and, more particularly, it concerns a novel arrangement for indicating the processed or unprocessed condition of the film strip within such a cassette.

U.S. Pat. No. 3,641,896, issued to Rogers B. Downey, et al., on Feb. 15, 1972; and U.S. Pat. Nos. 3,778,140 and 3,800,306, issued respectively on Dec. 11, 1973 and Mar. 26, 1974, to Edwin H. Land, contain exemplary disclosures of a motion picture system by which a supply of light sensitive film contained in a multipurpose cassette can be exposed in a camera adapted to receive the cassette and then processed or developed to provide the conventional series of positive transparent image frames by placing the cassette in a viewing apparatus capable of activating a processor also contained in the cassette. Thus, once the film strip has been exposed, the image sequence recorded thereon may be viewed by projection after a time interval only as long as that required to rewind the film strip, the processing operation being performed on the film during this initial rewind.

Of the many components required for satisfactory operation of such systems, the film cassette and the processor contained therein are perhaps most critical. For example, the development of transparent image frames on the light sensitive emulsion of the film strip after exposure in the camera of the system requires the deposit of processing fluid on the film strip. This is accomplished by expressing processing fluid through an orifice to a moving run of the film strip during the processing cycle. After the processing fluid is released upon initiation of the processing cycle, it must be deposited uniformly across the width of the emulsion as well as uniformly along the full useful length of the film strip with a high measure of reliability inasmuch as any non-uniformity or discontinuity in the layer of processing fluid deposited on the film strip will result in undesirable blemishes plainly observable in the images to be viewed. When the processing operation has been completed, any excess processing fluid within the cassette must be secured against leakage to the overall cassette interior. Finally, provision is made in the cassette for indicating whether the film strip has been processed or not inasmuch as the operating mode of the viewing apparatus in which the cassette is inserted after exposure is different for a cassette containing an exposed unprocessed film strip than it is for a cassette containing an exposed and processed film strip. Exemplary disclosures of such a motion picture film system having means for indicating the processed or unprocessed condition of the film strip within such a cassette are shown in the above-cited U.S. Pat. No. 3,778,140 as well as U.S. Pat. No. 3,785,725, issued to J. F. Batter, Jr., et al, on Jan. 15, 1974, and U.S. Pat. No. 4,003,064, to P. B. Mason, issued on Jan. 11, 1977.

In a typical system, the multipurpose film cassette is provided with a processed/unprocessed indicating means in the form of an internal electrical connection between two external electrical contacts which are accessible from the outside of the cassette housing. The internal electrical connection between the contacts is broken when the film is first rewound back onto the supply reel during processing. The existence of an electrical continuity between the two contacts indicates an unprocessed film, while an electrical discontinuity between the contacts indicates a processed film. The viewer/processor into which the cassette is inserted is provided with a control system which includes an operating cycle selector which is responsive to the cassette film condition indicating means to condition the control system for either a processed-film operating cycle or an unprocessed-film operating cycle.

Typically, a valve member, which is slidably mounted within the cassette and which is displaceable upon completion of processing to disable the film processing means, is used to form the internal electrical connection mentioned above. The valve member comprises a metallic portion which is movable, responsive to film advancement in a given direction following processing, from a first position wherein it provides the desired electrical interconnection to a second position wherein the valve member serves to disable the cassette-contained processor and wherein it no longer serves to provide an electrical connection between the two contacts. In most prior art arrangements, the electrical contact between the slidably mounted valve and the contacts contained within the cassette has been achieved as a result of a contact force resulting from an inherent resiliency in the two contacts and wherein the slidably mounted valve has been held downwardly against this inherent resiliency to establish the positive contact.

In addition to the functional importance of the cassette-contained components in the operation of the system, the cassette is preferably a package for both the supply of film and the processing fluid from the point of manufacture to use by the consumer. The cassette also serves as a permanent container for the exposed and processed film strip during storage and subsequent projection cycles. In this respect, therefore, the processing components contained in the cassette can be considered as disposable in light of their being used only once with each cassette manufactured. This aspect of the cassette adds a still further requirement; that is, that the processing components as well as other cassette components be inexpensive and capable of mass production without detracting from operational performance in effecting the processing operation. Although the cassette structure illustrated in the above-mentioned U.S. patents, as well as other patents and pending applications commonly owned by the assignee of the present invention, have evidenced significant success from the standpoint of achieving system objectives, there is a need for simplification and corresponding cost reduction in the cassette components which it is desirable to be capable of making by mass production manufacturing techniques. Further in order to reduce production costs, it is desirable to minimize the number of components in a cassette as well as to simplify the assembly process.

SUMMARY OF THE INVENTION

The invention is broadly directed to a multipurpose film handling cassette of the type in which a photographic film strip is exposed, processed and projected without removal from the cassette. The cassette includes a novel arrangement for indicating to the processor/viewer the unprocessed or processed condition of the film within the cassette.

In its illustrated embodiment, the cassette includes a means for indicating to a viewer/processor apparatus the processed or unprocessed condition of the film strip which includes a pair of spaced apart conductive elements rigidly mounted within the cassette. Each of the conductive elements includes a first conductive terminal lying in a spaced apart relationship with the first conductive terminal of the other of the conductive elements at a location in the interior of the cassette lying in a plane which is parallel to the plane of the film strip. Each of the pair of spaced apart conductive elements has a second conductive terminal positioned at a location adjacent an opening in the side wall of the cassette housing to thereby facilitate contact therewith by terminals contained within the viewer/processor. A slidable valve is mounted within the cassette for movement, responsive to advancement of the film from a first position wherein a conductive portion of the slidable element is in electrical connection between the first conductive terminals of both elements to a second position wherein the conductive element is not in electrical connection between the first conductive terminals. Advancement of the slidable element thus alters the conductive condition across the conductive elements thereby indicating the processed or unprocessed condition, as the case may be, of the film contained within the cassette to the viewer/processor apparatus.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been applied in the different figures to denote the same parts and wherein:

DESCRIPTION OF THE PREFERRED EMBODIMENT

Figure 1:
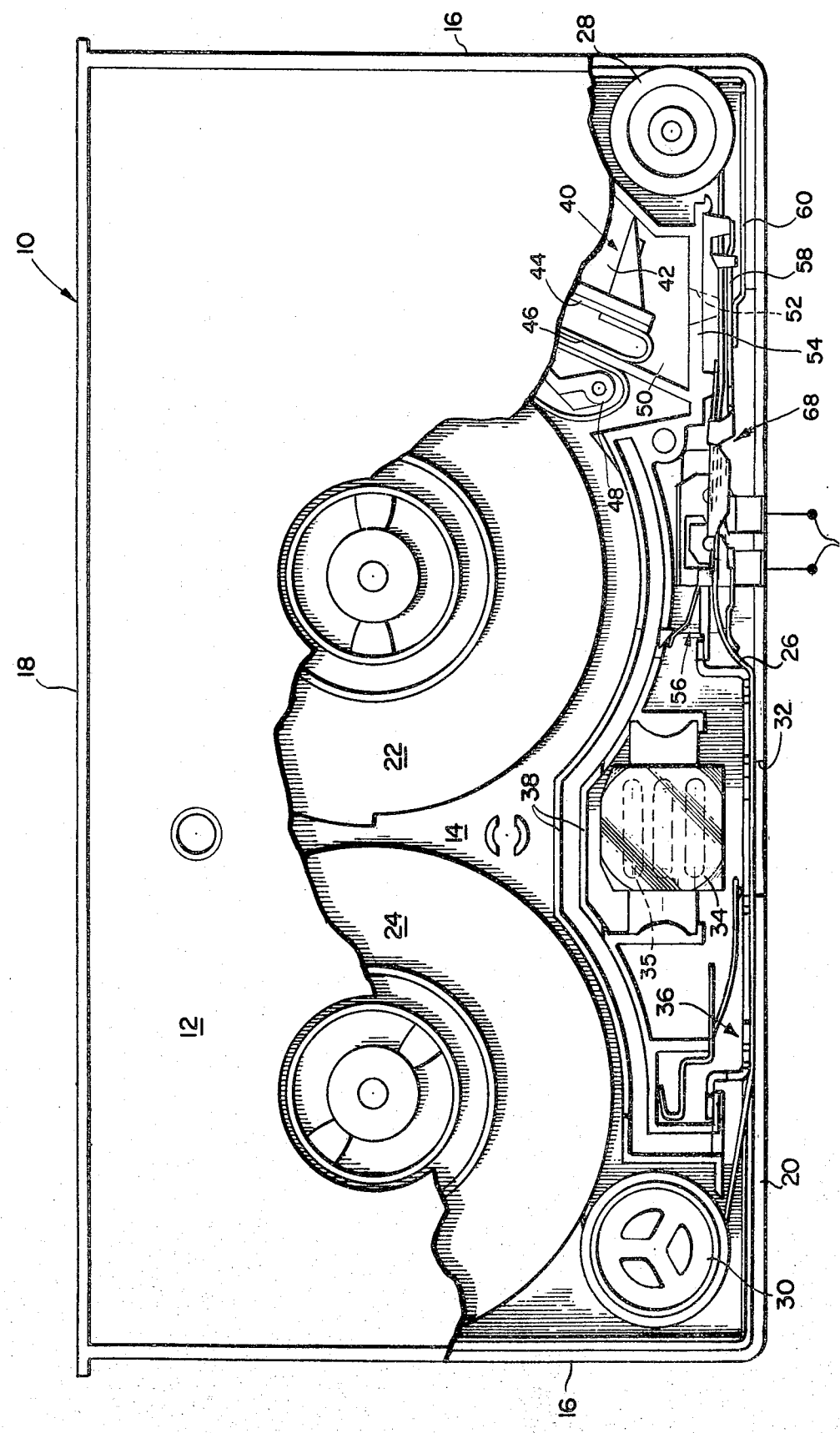
FIG. 1 is a diagrammatic view, in elevation, partially cut away to show the interior of a compact multipurpose film handling cassette embodying features of the present invention.

The multipurpose film cassette with which the present invention is particularly adapted for use is illustrated in FIG. 1 to include an outer housing 10 in the shape of a rectangular parallelepiped having front and back walls 12 and 14 respectively, end wall 16, a top wall 18 and a bottom wall 20. Mounted for rotation between the front and back walls are supply and takeup reels 22 and 24 to which supply and takeup leader ends of the film strip 26 are affixed by appropriate means. In passing from the supply reel 22 to the takeup reel 24, the film strip 26 is trained through a series of generally straight runs defined in part by an idler roller and a snubber roller 28 and 30, respectively, and a second idler roller disposed generally in the upper right hand corner of the cassette, not shown in the drawings. As shown, the film strip 26 is trained over an opening 32 in the bottom wall 20, both for exposure in an appropriate camera (not shown) and also for projection, in a viewer/processor shown only in part in FIGS. 2 and 3, by illumination passed through a reflecting prism 34 mounted in the cassette behind the opening 32 and the film strip 26 passing thereby. Situated behind the prism are air vent openings 35 in the back wall 14 to permit the circulation of air over the prism 34 for cooling and also for drying after film strip processing in the manner to be described below. A pressure plate 36 is mounted in the cassette housing behind the cassette opening 32 to support the segment of the film strip passing thereby. The air vents 35, the pressure plate 36 and the prism 34 are isolated from the supply and takeup spools 22 and 24 by a labyrinth-type light seal formed in part by internal ribs 38.

Also contained in the cassette housing 10 is a processor generally designated by the reference numeral 40 which is operative after exposure of the film strip 26 to deposit a layer of processing fluid onto the emulsion bearing side of the film strip over the entire length thereof. The processor includes a reservoir 42 in which the processing fluid is initially sealed by a tear tab closure 44 secured over a planar opening in the reservoir.

To enable release of the processing fluid from the initially sealed reservoir 42 after exposure of the film strip 26, a pull strip 46 having one end releasably secured to the tear tab closure 44 is trained about a pair of guide rollers, only one of which, 48, is shown in the drawing so that a free end (not shown) of the pull strip may be engaged by an aperture (not shown) in the supply end of the film strip 26 upon initial rewind movement thereof. The exact operation of the pull strip 46 is described fully in U.S. Pat. No. 3,895,862 of Joseph A. Stella, et al., which is assigned to the assignee of the present invention. Briefly, the free end portion of the pull strip 46 rides against the outermost convolution of the film strip contained on the supply spool 22 as the film strip is paid out from the supply spool to the takeup spool 24 during exposure of the film strip. Reversal of the film strip direction of movement during rewind, however, effects an attachment of the pull strip 46 to the supply end leader of the film strip so that the pull strip will be wound with the film onto the supply spool 22 as rewind continues. As a consequence, the tear tab closure 44 will be drawn away from the reservoir opening to release the processing fluid to a second chamber 50 in the processor 40.

The chamber 50 is located over an opening 52 in a processing fluid applicator nozzle 54 and the released processing fluid passes into the chamber and through the nozzle opening for application to the emulsion bearing side of the film strip 26. Incorporated in the processor 40 is a nozzle valve 56 which, as later explained with respect to the operation of the cassette, is utilized to close off the processor nozzle 54 and thereby disable the processor following treatment of the film strip 26 with the processing fluid. In relation to the nozzle opening 52, the valve 56 is positioned initially to the left as shown in FIG. 1 or upstream of the nozzle opening in terms of the direction of film strip travel during processing. Additionally, a pressure pad 58 supported by a leaf spring 60 retains the film strip in operative relation to the nozzle 54 during film strip processing.

It is to be noted that the multipurpose cassette and components thereof described in the preceeding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 24, rewind is initiated by driving the supply spool to rewind the film strip from the takeup spool 24 back onto the supply spool 22 as set forth above. This procedure is effected by removing the cassette from the camera in which it is exposed and placing it in a cassette-receiving well 62 provided in a processor/viewer device equiped with appropriate means for driving the supply spool 22 to rewind the film strip 26 in the manner described. During such rewinding movement, the emulsion side of the film strip will be drawn past the nozzle 52 to receive a layer of processing fluid which has been released from the reservoir 42 as a result of the tear tab closure 44 having been removed in the manner described above.

Prior to a discussion of the process mode or condition indicator of the present invention, the viewer apparatus with which the cassette is adapted to be used will be briefly described. As mentioned above, the cassette 10 is arranged for processing and projection operations within a viewer well 62 (see FIGS. 2 and 3) with its projection station opening 32 in registration with an aperture plate (not shown) provided in the bottom of the well 62. The cassette front wall is provided with an illumination aperture (not shown) located in alignment with the prism 34 and with a conventional projection lamp (not shown). During projection, the latter is configured to direct illumination into the cassette and then outwardly through incremental segments of the film 26 as such segments are progressively advanced across the opening 32. The viewer/processor is provided with suitable drive spindles (not shown) mounted alongside the well 62 for displacement into engagement with the supply and takeup reels once the cassette is properly located in the apparatus. Mounted beneath the cassette-receiving well 62 are conventional projector components (not shown) such as a claw mechanism, a rotary shutter and a projection lens assembly, the latter being configured to transmit the image bearing illumination emanating from the opening 32 and focus it in the plane of a viewing screen.

Figure 4:
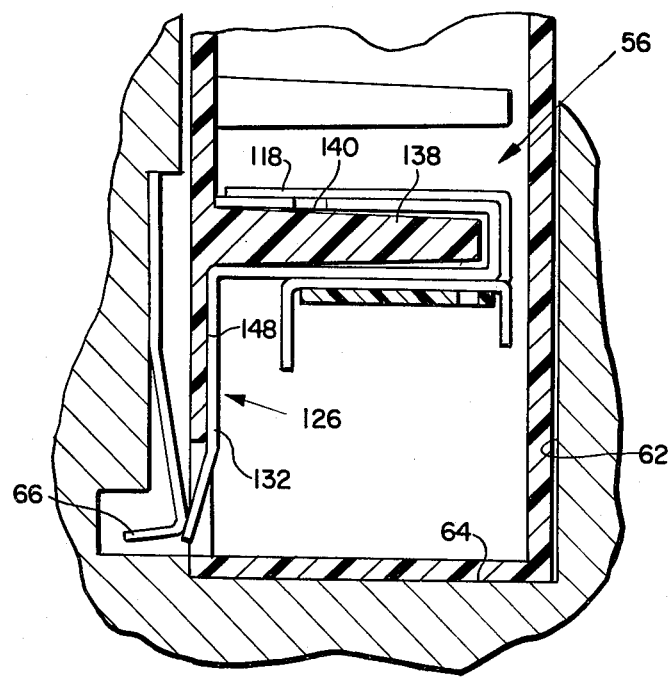
FIG. 4 is a view similar to FIG. 3 showing another embodiment of the process mode indicator.

Referring now to FIG. 4, located near the bottom 64 of the cassette receiving well 62 in position to cooperate with a cassette-contained element to be described below, are a pair of viewer process mode terminals 66, only one of which is physically shown in the referenced figures. Both process mode terminals 66 are shown schematically in FIG. 1. As set forth above, the cooperation of the cassette-contained process mode terminals 66 will signal the viewer/processor contained operating cycle selector to condition the control system for either an unprocessed-film operating cycle or a processed-film operating cycle.

Figure 2:
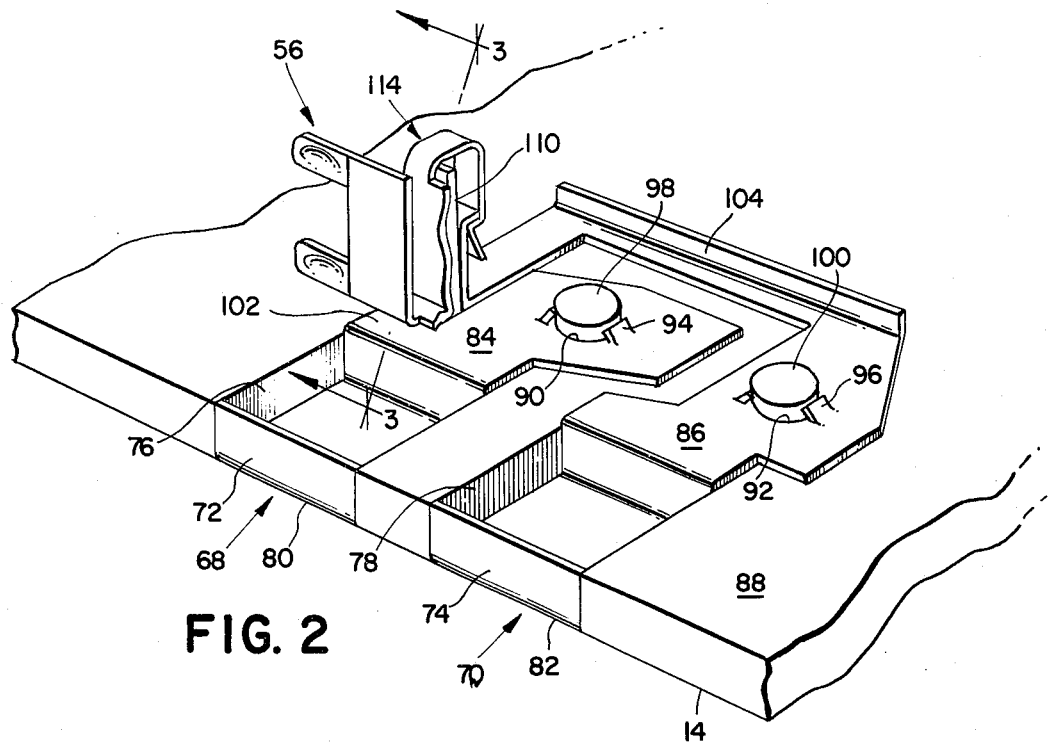
FIG. 2 is a perspective view of a portion of a cassette in the region of the process mode indicator according to one embodiment of the invention, illustrating in detail the mounting of such indicators to a cassette side wall.
Figure 3:
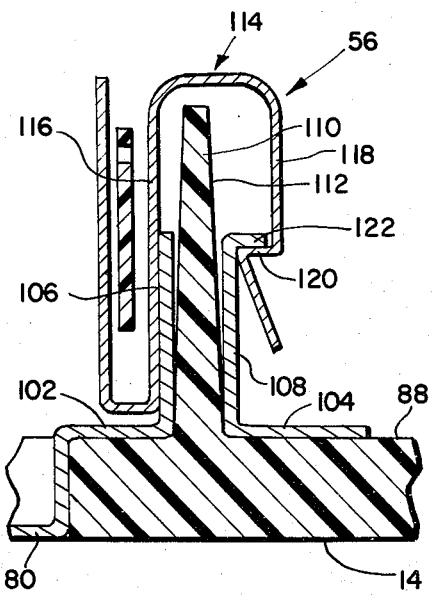
FIG. 3 is a view taken along the lines 3—3 of FIG. 2.

Turning now to FIGS. 1–3, a first embodiment of the process mode arrangement of the present invention is shown mounted in a multipurpose film cassette 10 in such a position wherein it will signal an unprocessed condition of the cassette-contained film. The switch comprises a pair of contact elements generally identified by the numerals 68, 70, formed from a suitable electrically conductive sheet material. Each of these contacts 68, 70 is provided with a substantially identical contact terminal 72, 74, respectively, formed at one end. Each of the terminals 72, 74 is adapted to be received in a mating recess 76, 78, respectively, provided in the cassette back wall 14, thereby each presenting an electrically conductive surface 80, 82, respectively, which may be contacted by the viewer/processor-contained control system contacts 66 upon placement of such a cassette in the cassette receiving well of the viewer/processor.

As best seen in FIG. 2, each of the process mode switch contact elements 68, 70 is provided with a flat section 84, 86, respectively, which is adapted to be received in confronting relation with the interior side 88 of the back wall 14 of the cassette housing. Each of these flat portions is provided with an opening, 90, 92 respectively, therein and a pair of upstanding tangs 94, 96 such that upstanding lugs 98, 100 integrally molded in the cassette wall 14 may be received therethrough when the switch is press fitted thereupon, thereby resulting in engagement of the tangs 94, 96 with the upstanding lugs and rigidly affixing each of the switch elements 68, 70 to the interior cassette wall 88. Extending from the flat base portions 84, 86 of each of the switch elements 68, 70 are additional extensions 102, 104, respectively, each of which terminates in an interior process mode switch contact surface 106, 108, respectively. The indicating element 68 oriented to the left as viewed in FIG. 2, extends in confronting relation with the wall 88 to a position adjacent an upstanding structural portion 110 carried within the cassette and terminates at that location in the vertically extending contact surface 106 which lies in a plane parallel to the plane of the film strip 26, as best seen in FIG. 3. The other of the process mode switch indicating elements 70 extends behind the film strip 26 around the base plate 86 of the other element 68 and terminates in the vertically extending contact surface 108 located adjacent the inside wall 112 of the upstanding structural portion 110 of the cassette housing.

With continued reference to FIGS. 1, 2 and 3, it will be seen that the displaceable nozzle valve 56 is shown installed within the cassette and comprises in part a substantially inverted U-shaped sheet metal section 114 which is adapted to extend around and slidably engage the vertically extending contact surfaces 106, 108 of the process mode switch indicating elements 68, 70, which are located on opposite sides of the upstanding structural portion 110 of the cassette. The exact configuration of this processor disabling valve 56 will not be described in detail; however, the valve as depicted in the drawing figures of the present application is described in great detail in U.S. Pat. No. 4,106,042 entitled "Multipurpose Film Cassette Having A Processor Disabling Valve Retention Arrangement" of Frank M. Czumak, et al., and assigned to the assignee of the present invention, which patent is herein incorporated by reference.

The important function of the slide valve 56 herein will be best appreciated with reference to FIG. 3, wherein it will be seen that the outside leg 116 of the inverted U-shaped element 114 establishes a positive electrical contact with the outwardly facing contact surface 106 of the indicating element 68 lying on the front side of the structural wall 110 and, similarly, the inside leg 118 of the U-shaped element establishes a positive electrical connection with the inwardly facing contact surface 108 of the indicating element 70 which is vertically disposed adjacent the interior wall 112 of the upstanding structural portion 110. Such arrangement thus assures electrical continuity between the two separate process mode switch indicating elements 68, 70 and, accordingly, assures the sensing of an electrical continuity by the viewer/processor terminals 66 when they contact the two separate terminal portions 72, 74 which are accessible from the exterior of the cassette.

With this in mind, it will be further appreciated that upon termination of the processing cycle, the film strip 26 is adapted to engage the slidable nozzle valve 56 to displace the valve to a position, with reference to FIG. 1, wherein it will lie between the processor pressure pad 58 and the nozzle element 54 to thereby space the pressure pad away from the nozzle to facilitate free film strip travel therepast upon termination of processing. It will be further appreciated that when in this position, the slidable valve 56 serves to permanently seal the nozzle opening 52 of the processor. Thus, when in this final position, the processor disabling valve 56 no longer contacts the vertically extending contact surfaces 106, 108 of the process mode indicator elements 68, 70 and, accordingly, subsequent insertions of such a cassette in a viewer/processor will result in the indicating elements of the viewer/processor sensing an electrically open circuit between the contact elements 72, 74 thus indicating to the viewer/processor that the cassette film has been processed and that it should go into a standard project operating cycle.

In some embodiments of the multipurpose film cassette of the present invention, an overlying cover (not shown) is provided in the processor region. This cover extends in part above the slide valve 56 and serves to retain the slide valve 56 downwardly in the position depicted in the drawing figures. However, when such a processor cover extension is not provided, the slide valve 56 as illustrated in FIGS. 2 and 3 is provided with an offset or jog 120 in its inside leg 118. This jog 120 is adapted to be received under a ledge 122 formed by suitably bending the upper end of the contact 108 to thereby provide a retaining arrangement for the slide valve 56 which will prevent the valve from moving upwardly while still facilitating the desired sliding motion of the valve when engaged by the film strip.

Figure 5:
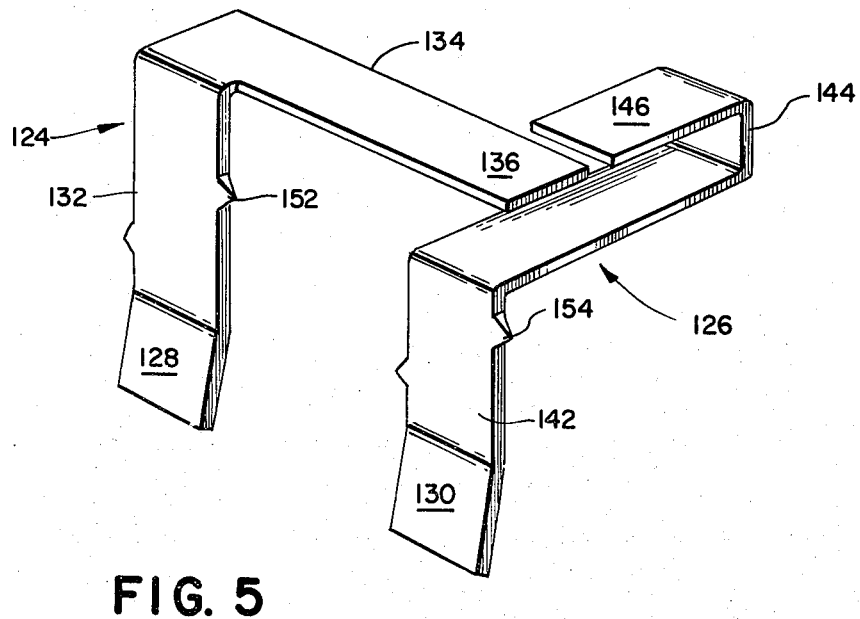
FIG. 5 is a perspective view of the process mode indicator of FIG. 3 showing the contact elements removed from a cassette.

FIGS. 4 and 5 illustrate a second embodiment of the process mode switch arrangement of the present invention. The principal of operation of this arrangement is the same as that described hereinabove in connection with the first illustrated embodiment; however, in the present case, both of the internal, cassette-contained vertically extending contact surfaces lie adjacent the rear wall of the upstanding structural slide valve supporting portion 138 of the cassette. More specifically, the arrangement includes a first element 124 which will be referred to as the left hand element and a second element 126 which will hereinafter be referred to as the right hand element. These elements are provided with a pair of substantially identical external contact surfaces 128, 130, respectively, which, as in the first described embodiment, when the elements 124 and 126 are installed in a cassette, extend at least partially through openings provided in the cassette side walls to provide access thereto by the viewer/processor-contained process mode terminals 66 as best seen in FIG. 4.

The left hand element 124 is provided with a first leg 132 which is adapted to be received in a mating substantially rectangular recess 148 provided in the base of the cassette housing wall. Such recess is not shown in detail in the drawing figures; however, with reference to FIG. 4, its position and orientation will be appreciated, with reference to the numeral 148 which is directed towards the lower surface of the reduced thickness portion of the cassette back wall 14 forming the bottom of the recess. The first leg 132 is also provided with a pair of outwardly extending barbs 152 which are configured to cooperate with the lateral edges of the recess 148 to thereby engage the lateral sides of the recess 148 and retain the left hand contact 124 within the recess 148 when it has been physically pressed therein. The left hand element 124 is further provided with a second leg 134 extending perpendicular to the first leg and terminating adjacent the inside surface 140 of the upstanding structural portion 138 of the cassette upon which the slide valve 56 is mounted as described in detail with respect to the first embodiment.

The right hand element 126 is mounted in a similar recess provided in the cassette bottom wall 14 and likewise is provided with a first leg 142 which also carries a pair of barbs 154 which cooperate with the mating recess to retain the right hand element 126 in its operational position. The right hand element is provided with a second leg 146 which extends perpendicularly upward from the first leg 142 and terminates in a U-shaped portion 144 which extends up and over the top end of the structural element 138 and terminates in a contact surface 146 which is also adjacent the inside wall 140 of the structural element and lying in the same plane as the contact surface 136 of the left hand element 124 and spaced therefrom so that electrical continuity does not exist between these elements when the slide valve 56 is not in position. Electrical continuity is established between the elements 124 and 126 by virtue of contact of the inside leg 118 of the slide valve with the surfaces 136 and 146 when the slide valve is installed as shown in FIG. 4.

Functional operation of the above-described embodiment is identical to that of the first-described arrangement and will not be repeated.

Accordingly, there has been provided a simple two-piece process mode indicating arrangement for a multipurpose film cassette wherein electrical continuity between a pair of cassette-contained contacts is established by a slidably displaceable valve which moves from a first position to a second position following processing of the film contained within the cassette and wherein no physical spring force or otherwise is necessary in order to assure the positive contact between the elements or to displace or hold the elements in different operational positions.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A photographic film cassette for use with other apparatus, said cassette configured for depositing a coating of processing fluid on a moving run of a cassette-retained photographic film strip to develop viewable images thereon, said cassette comprising:

a cassette housing;

means responsive to a drive arrangement of the other apparatus for advancing the film along a given path within said housing;

means actuatable responsive to film strip advancement in a given direction for depositing processing fluid on the advancing film strip;

means for indicating to the other apparatus the processed or unprocessed condition of the film strip, said indicating means comprising a pair of spaced apart conductive elements fixedly mounted within said cassette, each of said conductive elements having a first conductive terminal, each of said first conductive terminals being non-resilient, and being rigidly supported in spaced apart relationship with respect to the other of said first conductive terminals at a location in the interior of said cassette and in a plane which is parallel to the plane of the advancing film strip, and each of said pair of spaced apart conductive elements having a second conductive terminal positioned at a location adjacent a wall of said cassette housing; and a contact element slidably mounted in said cassette for movement, responsive to film advancement in said given direction, from a first position wherein a conductive portion of said element is in electrical connection between said non-resilient, rigidly supported first conductive terminals and a second position wherein said conductive element is not in electrical connection between said first conductive terminals so as to alter the conductive condition across said conductive elements between a closed and an open condition in accordance with displacement of said slidably mounted contact element, thereby indicating said process condition to said other apparatus.

2. The apparatus of claim 1 wherein said first conductive terminals are in spaced apart coplanar relationship with one another.

3. The apparatus of claim 1 wherein said cassette housing includes an upstanding structural portion having two opposing surfaces lying in respective planes, substantially parallel to the plane of the film strip; and wherein one of said first conductive terminals is supported in confronting relation with one of said opposing surfaces and, the other of said first conductive terminals is supported in confronting relation with the other of said opposing surfaces.

4. The apparatus of claim 3 wherein said slidably mounted contact element comprises an inverted U-shaped portion having a first leg in electrically conductive contact with one of said first conductive terminals and a second leg in electrically conductive contact with the other of said first conductive terminals.

5. The apparatus of claim 3 wherein at least one of said first conductive terminals is structurally configured to cooperate with a mating configuration provided on the leg of said U-shaped portion with which it is in electrical contact, such cooperation serving to retain said contact element in said electrically conductive position while permitting said sliding movement of said element responsive to film advancement to its said second position.

* * * * *